US007852735B2

(12) United States Patent
Mori et al.

(10) Patent No.: US 7,852,735 B2
(45) Date of Patent: Dec. 14, 2010

(54) OPTICAL PICKUP DEVICE

(75) Inventors: Kazushi Mori, Hirakata (JP);
Katsutoshi Hibino, Kaizu (JP); Kenji Asano, Kakamigahara (JP); Kenji Nagatomi, Kaidu (JP); Shogo Suzuki, Mizuho (JP); Naoyuki Takagi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 503 days.

(21) Appl. No.: 11/943,251

(22) Filed: Nov. 20, 2007

(65) Prior Publication Data

US 2008/0137513 A1 Jun. 12, 2008

(30) Foreign Application Priority Data

Nov. 21, 2006 (JP) ............................. 2006-314516

(51) Int. Cl.
*G11B 7/135* (2006.01)

(52) U.S. Cl. ................................................. 369/112.03

(58) Field of Classification Search ....................... None
See application file for complete search history.

(56) References Cited

U.S. PATENT DOCUMENTS

| 5,161,148 | A | * | 11/1992 | Hori et al. | ............... | 369/112.25 |
| 5,270,996 | A | * | 12/1993 | Ono | ....................... | 369/112.12 |
| 5,406,543 | A | * | 4/1995 | Kobayashi et al. | ............ | 369/121 |
| 5,615,200 | A | * | 3/1997 | Hoshino et al. | ......... | 369/112.04 |
| 6,208,610 | B1 | * | 3/2001 | Kawakami et al. | ...... | 369/112.01 |
| 6,256,285 | B1 | * | 7/2001 | Coombs | ................. | 369/112.03 |
| 6,868,055 | B2 | * | 3/2005 | Ueyama et al. | ......... | 369/112.15 |
| 6,987,614 | B2 | * | 1/2006 | Fukasawa et al. | ............ | 359/566 |
| 7,345,981 | B2 | * | 3/2008 | Kim et al. | .............. | 369/112.03 |
| 2004/0196771 | A1 | * | 10/2004 | Shimano et al. | ......... | 369/112.03 |
| 2005/0161579 | A1 | * | 7/2005 | Kim et al. | ................. | 250/201.5 |
| 2008/0137513 | A1 | * | 6/2008 | Mori et al. | .............. | 369/109.01 |
| 2009/0274031 | A1 | * | 11/2009 | Kouno | .................... | 369/112.03 |

FOREIGN PATENT DOCUMENTS

| CN | 1641763 A | 7/2005 |
| JP | 2002-367211 | 12/2002 |
| JP | 2005-063595 | 3/2005 |

OTHER PUBLICATIONS

Chinese Office Action for corresponding CN Application No. 200710188645.2, dated Sep. 18, 2009, pp. 1-13.

* cited by examiner

*Primary Examiner*—Peter Vincent Agustin
(74) *Attorney, Agent, or Firm*—Ditthavong, Mori & Steiner, P.C.

(57) ABSTRACT

A diffraction element is disposed between a beam branching element (such as a beam splitter) and a photodetector. The diffraction element further segment an interference fringe introduced into stray light by a diffraction grating which divides a laser beam emitted from a laser beam source into a main beam and two sub-beams.

9 Claims, 17 Drawing Sheets

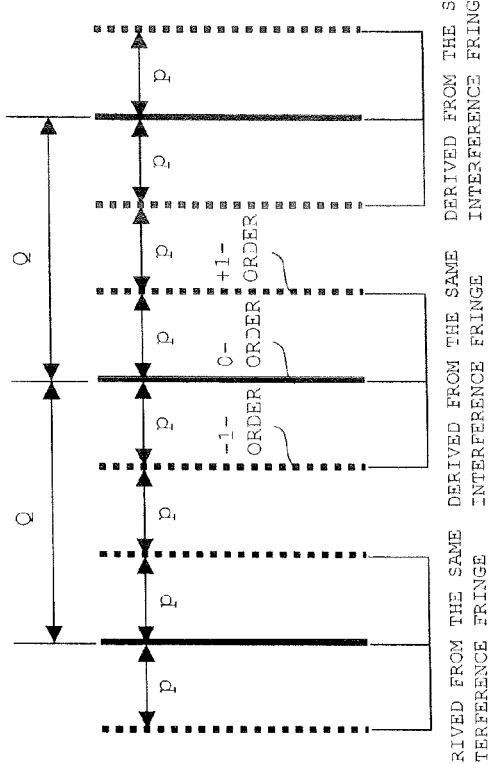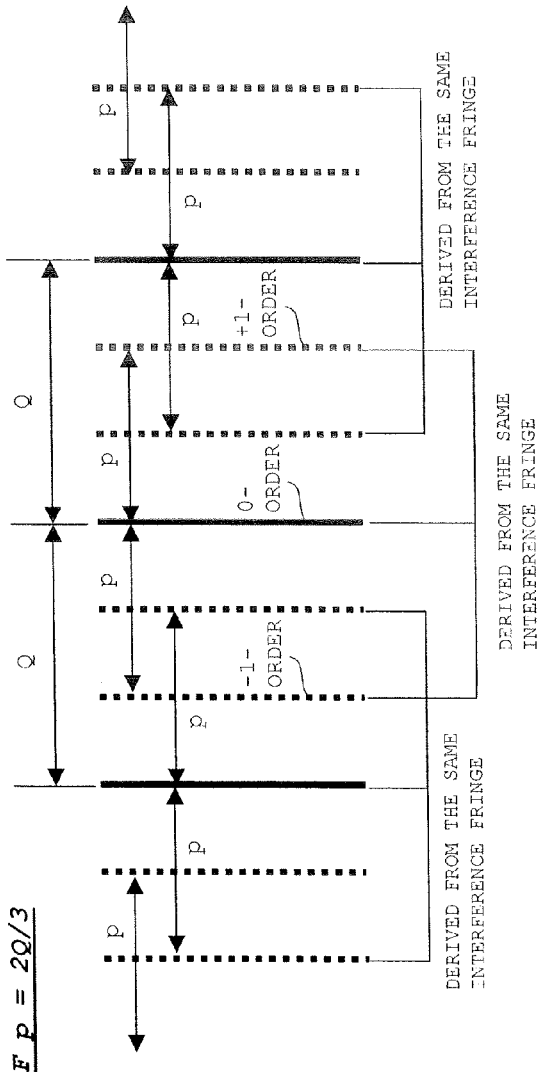

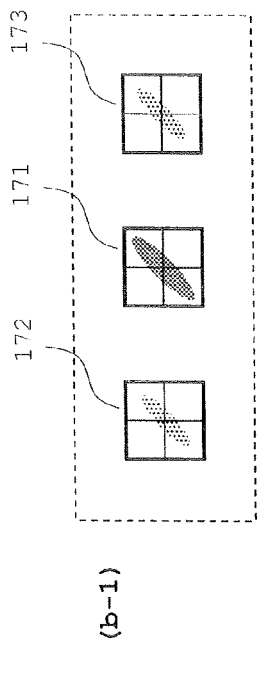
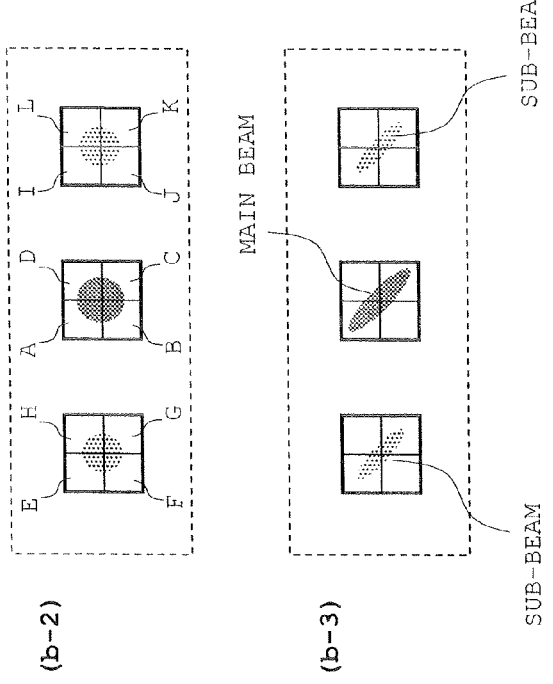
FIG. 9A
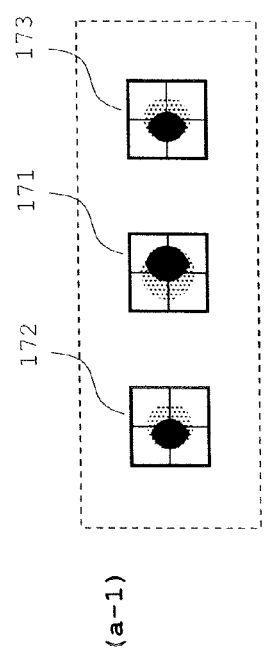
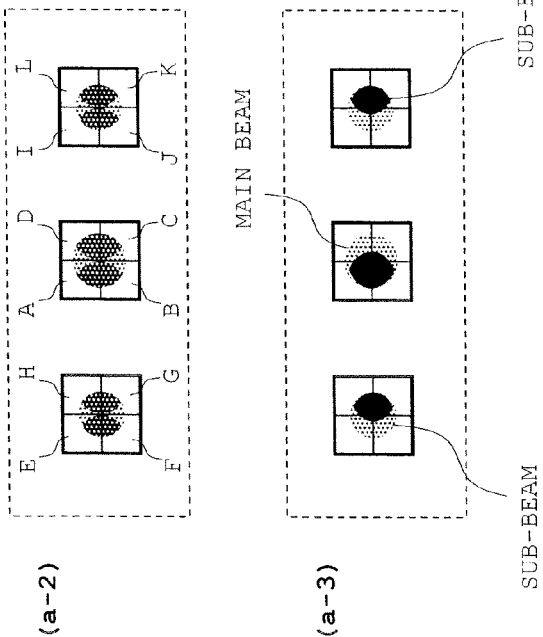
FIG. 9B

OPTICAL PICKUP DEVICE

This application claims priority under 35 U.S.C. Section 119 of Japanese Patent Application No. 2006-314516 filed Nov. 21, 2006, entitled "OPTICAL PICKUP DEVICE".

BACKGROUND OF THE INVENTION

1. Field of the Invention

The present invention relates to optical pickup devices, and more particularly, to an optical pickup device suitably used to irradiate laser light on a disk in which a plurality of recording layers are laminated.

2. Description of the Related Art

An optical pickup device for focusing a laser beam onto a disk recording surface is arranged in an optical disk drive which records and reproduces information in and from an optical disk such as a CD (Compact Disc) and a DVD (Digital Versatile Disc).

FIG. 17 shows a basic configuration of the optical pickup device. In FIG. 17, the numeral 11 designates a semiconductor laser, the numeral 12 designates a diffraction grating, the numeral 13 designates a beam splitter, the numeral 14 designates a collimator lens, the numeral 15 designates an objective lens, the numeral 16 designates a cylindrical lens, and the numeral 17 designates a photodetector.

The laser beam emitted from the semiconductor laser 11 is divided into a main beam (0-order diffraction light) and two sub-beams (±1-order diffraction light) by the diffraction grating 12, and the light beams are incident on the beam splitter 13. The laser beams transmitted through the beam splitter 13 are converted into substantially parallel light by the collimator lens 14, and the laser beams are focused on the disk recording surface by the objective lens 15.

The light reflected from the disk reversely proceeds the optical path in which the light is incident on the disk, and the light is partially reflected by the beam splitter 13. After astigmatism is introduced by the cylindrical lens 16, the light is focused on a light receiving surface of the photodetector 17. In the configuration shown in FIG. 7, an astigmatism method is adopted as a technique of detecting focus error.

FIG. 8A shows an arrangement of spots of the three beams (main beam and sub-beams) on the disk recording surface. FIG. 8A shows the state where the three beams are focused on the disk on which grooves and lands are arranged.

As shown in FIG. 8A, in the recording and reproducing operation, the main beam is focused on a groove and the two sub-beams are separately focused on lands which sandwich the groove from both sides. The spots of FIG. 8A are arranged to perform good tracking error detection by a differential push-pull method to be described later.

FIG. 8B shows light intensity distribution of the main beam and two sub-beams on the disk recording surface.

The recording in the disk is performed only by the main beam and the two sub-beams are used to generate a tracking error signal and a focus error signal. Light intensity of the main beam is set much higher than light intensity of the sub-beams. This is because a laser output from the semiconductor laser 11 is efficiently utilized in the recording. A recording speed to the disk can be higher as the laser beam intensity is increased on the recording surface. Therefore, the laser output from the semiconductor laser 11 is divided into the main beam and the sub-beams such that an intensity portion of the main beam used in the recording is much higher than those of the sub-beams.

A light intensity ratio between the main beam and the sub-beam is determined by diffraction efficiency (usually grating depth) of the diffraction grating 12. Usually the main beam intensity is 10 to 18 times the sub-beam intensity. The ratio is directly reflected on an intensity ratio between the main beam and the sub-beam on the light receiving surface of the photodetector 17.

FIG. 9A illustrates a principle of tracking error detection by the differential push-pull method.

Referring to FIG. 9A, the numerals 171, 172, and 173 designate a quadrant sensor arranged on the photodetector 17. The main beam is accepted by the quadrant sensor 171, and the two sub-beams accepted by the quadrant sensors 172 and 173 respectively. FIG. 9A shows focusing spots of the main beam and the sub-beam located on the quadrant sensors 171, 172, and 173. Light intensity distribution is schematically shown in each spot, and hatching is performed such that the color is brought close to black as the light intensity is increased.

As shown in FIG. 9A, the letters A to L designate sensor units of the quadrant sensors 171, 172, and 173 respectively. Assuming that PA to PL are detection outputs of the sensor units A to L, a differential push-pull signal (DPP) is given by the following equation.

$$DPP=\{(PA+PB)-(PC+PD)\}-k1\cdot\{(PE+PF+PI+PJ)-(PG+PH+PK+PL)\} \quad (1)$$

At this point, the coefficient $k1$ corresponds to a sensitivity multiplying factor of a sub-light receiving unit, and the coefficient $k1$ is set such that the detection output of the main beam is equal to the summation of the detection outputs of the sub-beams.

As shown in FIG. 8A, when the main beam is in the state where the main beam is focused at the center position of the track (groove), the main beam and two sub-beams located on the light receiving surface of the photodetector 17 become the spot states shown in part (a-2) of FIG. 9A. In this case, the light intensity distribution of each spot becomes symmetry in relation to one parting line of the quadrant sensor. Accordingly, when the computation is performed by the equation (1), the differential push-pull signal (DPP) becomes zero.

When the main beam is displaced in the radial direction (vertical direction in the paper plane) from the state shown in FIG. 8A, the main beam and two sub-beams located on the light receiving surface of the photodetector 17 become the spot states shown in part (a-1) or (a-3) of FIG. 9A. Parts (a-1) and (a-3) of FIG. 9A shows the states in which the main beam generates track shift from the center of the track toward an outer circumference direction and an inner circumference direction of the disk respectively.

In this case, the light intensity distribution of the main beam and two sub-beams located on the light receiving surface become the state in which the light intensity distribution is biased in the horizontal direction of the paper plane. As can be seen from comparison of parts (a-1) and (a-3) of FIG. 9A, the bias direction of the light intensity distribution in each spot becomes opposite according to the track shift direction of the main beam. The main beam differs from the sub-beam in that the direction in which the light intensity is biased is opposite.

The reason why the direction in which the light intensity is biased is not orthogonal to the direction in which the three spots are arranged (track direction) is that the intensity distribution within the spot is transformed by 90 degrees by the astigmatic action.

When the computation is performed by the equation (1), the differential push-pull signal (DPP) becomes a negative value in the state shown in part (a-1) of FIG. 9A, and becomes a positive value in the state shown in part (a-3). Accordingly, the track shift of the main beam on the disk can be detected based on the differential push-pull signal (DPP).

In a so-called one-beam push-pull method, a push-pull signal is generated only from the main beam, and the track shift of the main beam is detected based on the push-pull signal. However, in the one-beam push-pull method, a DC offset is generated in the push-pull signal due to inclination of the disk and an optical axis shift of the objective lens, which results in degradation of accuracy of track shift detection. On the other hand, in the differential push-pull method, the DC offset is cancelled by the computation of the equation (1), so that the accuracy of track shift detection can be enhanced.

FIG. 9B illustrates a principle of focus error detection by the differential astigmatism method. In this case, the focusing spots of the main beam and two sub-beams located on the light receiving surface of the photodetector 17 are changed from a perfect circle to an ellipse according to a focus shift.

When the main beam is focused on the disk recording surface, the spot shapes of the main beam and two sub-beams located on the light receiving surface of the photodetector 17 become substantially a perfect circle as shown in part (b-2) of FIG. 9B. On the other hand, when the focal position of the main beam is shifted forward and backward with respect to the disk recording surface, the spot shapes of the main beam and two sub-beams located on the light receiving surface of the photodetector 17 are deformed as shown in part (b-1) or (b-3) of FIG. 9B.

In this case, a differential astigmatism signal (DAS) is obtained by the following equation.

$$DAS=\{(PA+PC)-(PB+PD)\}-k2\cdot\{(PE+PG+PI+PK)-(PF+PH+PJ+PL)\} \qquad (2)$$

where k2 is a coefficient which has the same meaning as k1.

In the on-focus state shown in part (b-2) of FIG. 9B, because the main beam and two sub-beams located on the light receiving surface of the photodetector 17 have the spot shape of substantially perfect circle, when the computation of the equation (2) is performed, the differential astigmatism signal (DAS) becomes zero. On the contrary, when the focal position of the main beam is shifted forward and backward from the recording surface, the spot shape of each beam is deformed into an ellipse in a different direction depending on the focus shift direction as shown in parts (b-1) and (b-3) of FIG. 9B. Therefore, when the computation of the equation (2) is performed, the differential astigmatism signal (DAS) becomes sometimes negative ((b-1) of FIG. 9B), and sometimes positive ((b-3) of FIG. 9B). Accordingly, the focus shift of the main beam on the disk recording surface can be detected based on the differential astigmatism signal (DAS).

As with the track shift detection, in the focus shift detection, the focus error signal can be generated only from the main beam. However, when the focus error signal is generated only from the main beam, the push-pull signal is superposed as a noise on the focus error signal in traversing the track of the spot on the disk, which results in a problem that a good focus error signal cannot be obtained. On the contrary, in the differential astigmatism method, because the push-pull signal which is a noise is cancelled by the computation of the equation (2), the good focus error signal can be obtained.

Thus, in order to enhance the accuracy of tracking error signal and focus error signal, the detection signal based on the sub-beam plays a significant role.

A disk (hereinafter referred to as "multi-layer disk") in which a plurality of recording layers are laminated has been developed and commercialized in response to a demand of recording large-capacity information in the disk. In the next-generation DVD which is currently being commercialized, the recording layers can be laminated corresponding to a blue laser beam having a wavelength of about 400 nm.

The differential push-pull method and the differential astigmatism method can be adopted even in this kind of multi-layer disks. However, when these techniques are used on the multi-layer disk, the light (stray light) reflected from the recording layer except the recording layer of the recording and reproducing target is incident on the photodetector 17, which results in a problem of lowering the accuracy of focus error signal and tracking error signal. This is so-called a problem of signal degradation caused by the stray light.

FIGS. 10A and 10B show a stray light generation state where a laser beam is focused on a multi-layer disk having two recording layers. In FIGS. 10A and 10B, the signal light (light reflected from the recording layer which is of the recording and reproducing target) is shown with a solid line, and the stray light is shown with a broken line.

FIG. 10A shows a state in which the laser beam emitted from the optical pickup device is focused on a recording layer L1. In this case, the light which is transmitted through the recording layer L1 and reflected from a recording layer L0 becomes the stray light. Because the light reflected from the recording layer L0 becomes divergent light whose starting point is located farther than the recording layer L1 with respect to the objective lens 15, the light becomes a slightly focused state compared with the parallel light, after transmitted through the objective lens 15. Accordingly, because the focal point by the collimator lens 14 is brought close to the disk side of the light receiving surface of the photodetector 17, the spot becomes a widely spread spot on the light receiving surface of the photodetector 17.

FIG. 10B shows a state in which the laser beam emitted from the optical pickup device is focused on the recording layer L0. In this case, the light reflected from the recording layer L1 becomes the stray light. Because the light reflected from the recording layer L1 becomes divergent light whose starting point is located closer to the objective lens 15 compared with the recording layer L0, the light becomes a slightly divergent state compared with the parallel light, after transmitted through the objective lens 15. Accordingly, because the focal point by the collimator lens 14 is separated from the disk with respect to the light receiving surface of the photodetector 17, the spot becomes a widely spread spot on the light receiving surface of the photodetector 17.

FIG. 11 shows an irradiation state of the stray light on the light receiving surface of the photodetector 17. In this case, the light receiving surface is irradiated with the stray light such that all the quadrant sensors 171, 172, and 173 are covered with the stray light. There are three stray light beams including the stray light based on the main beam and the stray light based on the two sub-beams, the stray light of the sub-beam is also incident on the light receiving surface while overlapping the stray light of the main beam. However, the stray light of the sub-beam has light intensity which has little influence on the focus error signal and tracking error signal, so that only the stray light of the main beam is shown in FIG. 11 for convenience sake.

FIG. 12 shows light intensity distribution of the signal light and the stray light on the light receiving surface of the photodetector 17. As will be described later, the stray light constitutes an interference fringe on the light receiving surface of the photodetector 17 by phase modulation action of the diffraction grating 12. Therefore, in the intensity distribution of actual stray light, a strong portion and a weak portion are repeated in the form of a wave corresponding to the interference fringe. The stray light intensity distribution of FIG. 12 expresses an envelope curve of the change in intensity caused by the interference fringe.

As shown in FIG. 12, peak intensity of the stray light is considerably lower than peak intensity of the signal light of the main beam. Therefore, the stray light has little influence on the signal light of the main beam. On the other hand, because the stray light intensity at the position of the sub-beam is close to the intensity of the signal light of the sub-beam, sometimes a behavior of the stray light has a strong influence on the sub-beam detection signal.

FIG. 13 schematically shows the interference fringe generated by the stray light on the light receiving surface. As shown in FIG. 13, the spacing between the interference fringes is usually such that several interference fringes are cast on a set of quadrant sensors. When incident positions of the interference fringes are fixed with respect to the quadrant sensors, the influence of the interference fringe on the sub-beam detection signal can be removed by appropriately performing signal processing. However, as is clear from the comparison of the regions S1 in FIGS. 13, 14A, and 14B, the incident positions of the interference fringes with respect to the quadrant sensors change over time in actuality. This may be attributed to inclination of the optical disk, a temporal change in optical path length, an uneven thickness of the optical disk substrate, uneven birefringent distribution, and the like.

In such cases, assuming that the light intensity does not change along the interference fringe line in one interference fringe, the influences caused by the change in position of the interference fringes cancel each other by the computation of the equation (2) with respect to the above-described focal error signal (differential astigmatic signal: DAS). However, for the tracking error signal (differential push-pull signal: DPP), the influences do not cancel each other even if the equation (1) is computed.

An influence of the change in position of the interference fringe on the tracking error signal will be described with reference to FIGS. 15A to 15C. FIGS. 15A to 15C show examples of the change in interference fringe near the region S1 of FIGS. 13, 14A, and 14B. On the optical disk, it is assumed that the main spot is located at the center of the track while the signal spot on the photodetector 17 is in the state shown in (a-2) of FIG. 9A.

In this case, because the light intensity distribution in the main beam and sub-beams are symmetrical relative to one sensor parting line (line dividing the quadrant sensor 172 into sensor units E and F and sensor units H and G), the tracking error signal DPP becomes zero by the computation of the equation (1) unless the stray light has any influence. However, in consideration of the influence of the stray light, when the stray light interference fringe is located at the position of FIG. 15 with respect to the light receiving surface of the photodetector 17, the stray light intensity distribution becomes asymmetrical relative to the sensor parting line, so that the computation result of the equation (1) takes a value except zero.

When the stray light interference fringe is changed from the state of FIG. 15A to the state of FIG. 15B, the light quantity corresponding to an area IEF1 of FIG. 15B is increased in regions (E+F) of the sensor units E and F. On the other hand, in regions (G+H) of the sensor units G and H, the light quantity corresponding to an area IGH1 of FIG. 15B is increased while the light quantity corresponding to an area DGH1 is decreased. However, because the area of DGH1 of FIG. 15A is larger than the area of IGH1, in the regions (G+H) of the sensor units G and H, the total amount of light received is decreased as compared with the case of FIG. 15A. Accordingly, the computation result (tracking error signal DPP) by the equation (1) in the state of FIG. 15B is further changed from the case of FIG. 15A.

When the stray light interference fringe is changed from the state of FIG. 15B to the state of FIG. 15C, in the regions (E+F) of the sensor units E and F, the light quantity corresponding to an area IEF2 of FIG. 15C is increased while the light quantity corresponding to an area DEF2 is decreased. Because the area of IEF2 is larger than the area of DEF2 of FIG. 15B, the total amount of light received is increased as compared with the case of FIG. 15B. On the other hand, in the regions (G+H) of the sensor units G and H, the light quantity corresponding to an area IGH2 of FIG. 15C is increased while the light quantity corresponding to an area DGH2 is decreased. However, because the area of DGH2 of FIG. 15B is substantially equal to the area of IGH2 of FIG. 15C, the total amount of light received is substantially unchanged as compared with the case of FIG. 15B. Accordingly, the computation result (tracking error signal DPP) by the equation (1) in the state of FIG. 15C is further changed from the case of FIG. 15B.

Thus, the magnitude of the tracking error signal is sequentially changed according to the temporal change in position of the stray light interference fringe. At this point, because the position of the stray light interference fringe is usually changed at substantially the same frequency as the tracking error signal, the influence of the stray light interference fringe on the tracking error signal is generated in the form of a strong noise.

Therefore, the following techniques are proposed to solve the problem. FIG. 16A shows a configuration of the optical pickup device according to a first technique. In the configuration example of FIG. 16A, a light shielding member is inserted into an optical path of the laser beam, and the stray light is blocked by a light shielding portion provided on the light shielding member. At this point, FIG. 16B shows the spot states of the main beam and sub-beam and the stray light irradiation state on the light receiving surface of the photodetector.

As shown in FIG. 16B, in the configuration example, the stray light is prevented from entering the quadrant sensor. However, at the same time, because part of the signal light is also blocked by the light shielding portion, a region (shown by "N" in FIG. 16B) where the reflected light is lost is generated in the spots of the main beam and of the sub-beams on the light receiving surface of the photodetector. Particularly, the lost region in the spot of the main beam signal light becomes a problem. That is, the lost region in the spot of the main beam signal light is generated in the central portion of the spot having strong light intensity, which results in a problem of remarkably lowering quality of the RF signal or the focus error signal.

FIG. 17A shows a configuration of the optical pickup device according to a second technique. In the configuration example of FIG. 17A, a prism having two critical angle planes (first critical angle plane and second critical angle plane) is arranged between the collimator lens and the objective lens. At this point, the first critical angle plane and the second critical angle plane reflect only the light having a predetermined incident angle (critical angle) or larger. Therefore, half of the stray light is blocked in the first critical angle plane, and the other half is blocked in the second critical angle plane.

In this case, because the critical angle condition is steep, the stray light is substantially eliminated on the light receiving surface of the photodetector as shown in FIG. 17B. However, at the same time, because the sub-beam signal light is incident on the prism while shifted from the parallel light state, the sub-beam signal light is also blocked when it is incident on the first critical angle plane and the second critical angle plane, and is not introduced onto the light receiving surface of the photodetector as shown in FIG. 17B.

SUMMARY OF THE INVENTION

An aspect according to the present invention provides an optical pickup device including a light source which emits the laser beam; a diffraction grating which divides the laser beam into a main beam and two sub-beams; an objective lens which causes the main beam and the two sub-beams to converge on a target recording layer among a plurality of recording layers; a photodetector which includes three light receiving units for separately receiving the main beam and two sub-beams reflected from the target recording layer; a beam branching element which separates the laser beam traveling from the light source toward the objective lens and the reflected light toward the photodetector; and a diffraction element disposed between the beam branching element and the photodetector to further segment an interference fringe of light reflected from a recording layer except the target recording layer on the light receiving unit, the interference fringe being generated by optical action in the diffraction grating.

In the optical pickup device according to the aspect of the present invention, because the interference fringe is segmented on the light receiving unit, the undulation of the change in intensity of the stray light is suppressed to a small level on the light receiving unit. Therefore, even if the position of the interference fringe is changed on the light receiving unit, the signal from the light receiving unit is not greatly changed.

BRIEF DESCRIPTION OF THE DRAWINGS

The above and other objects and features of the present invention will be fully apparent from the following description of preferred embodiments taken in connection with the accompanying drawings:

FIGS. 5A and 5B are diagrams illustrating a method of designing the diffraction element according to the embodiment;

FIG. 9 shows states of a main beam and sub-beams on a photodetector;

However, the drawings are used for illustration by way of example, and the present invention is not limited by the drawings.

DESCRIPTION OF THE PREFERRED EMBODIMENTS

Figure 1B:
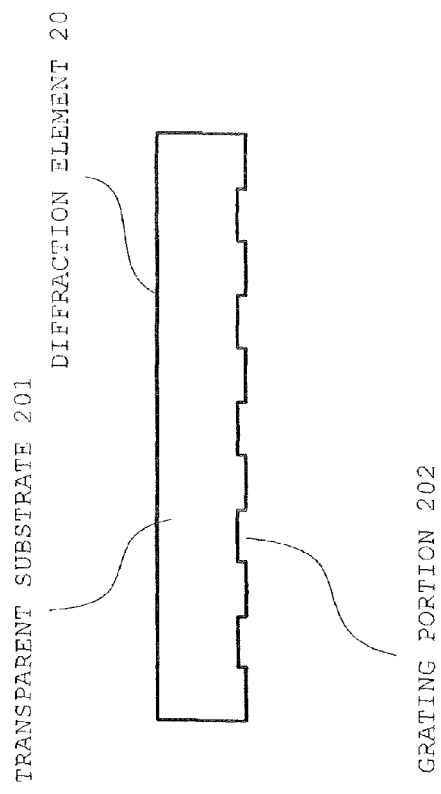
FIGS. 1A and 1B show a configuration of an optical pickup device according to an embodiment of the present invention.
Figure 1A:
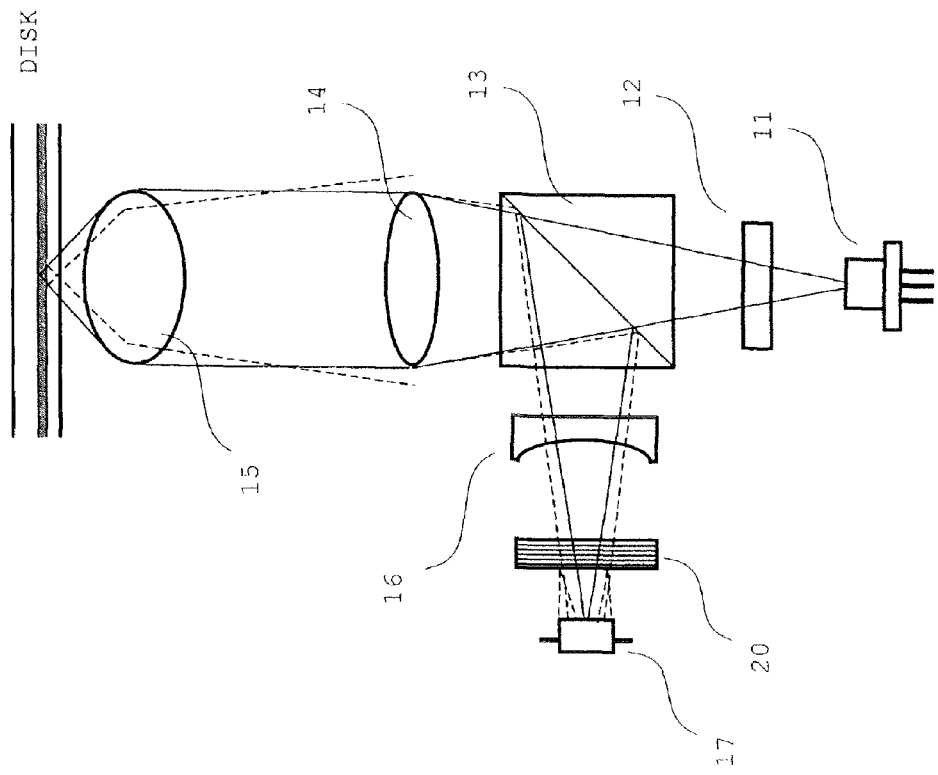
Figure 7:
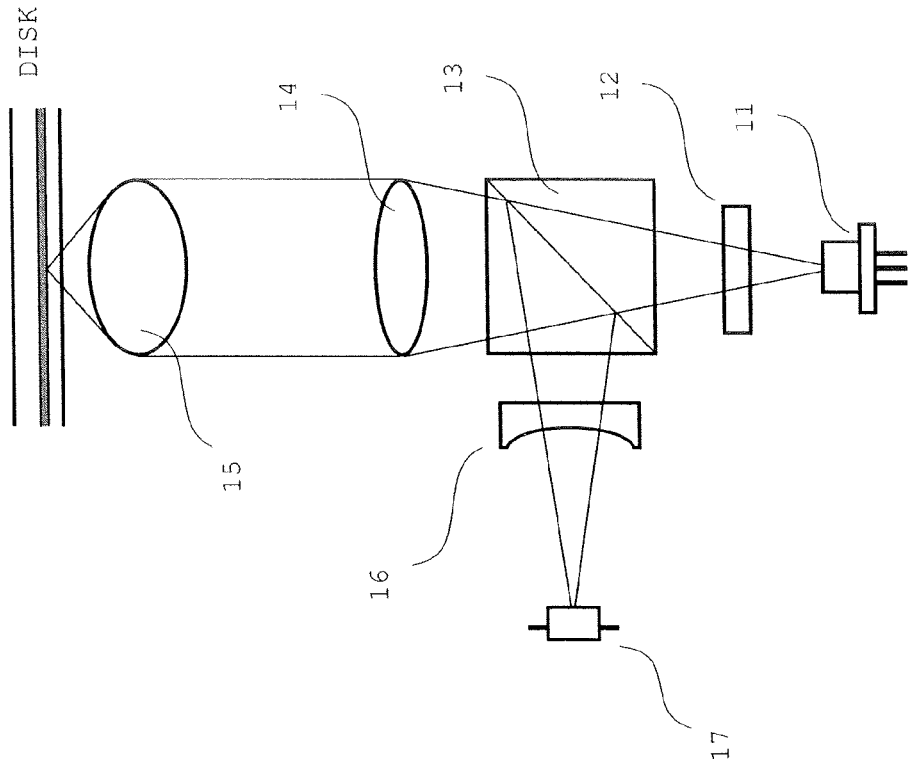
FIG. 7 shows a configuration of an optical pickup device according to the related art.
Figure 8B:
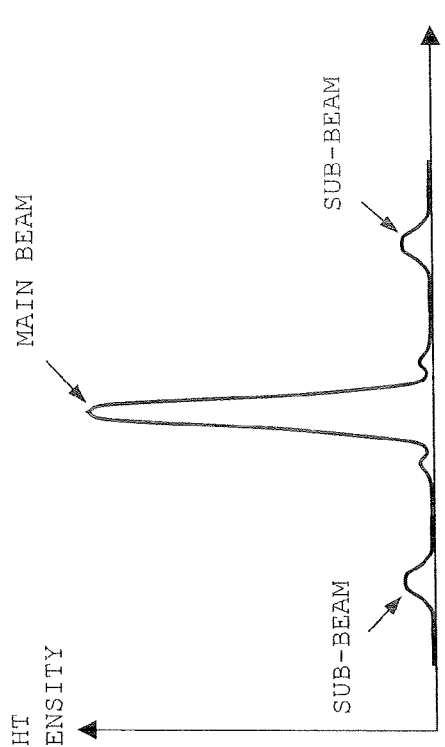
FIG. 8 shows a laser beam irradiation state and light intensity distribution on an optical disk.
Figure 8A:
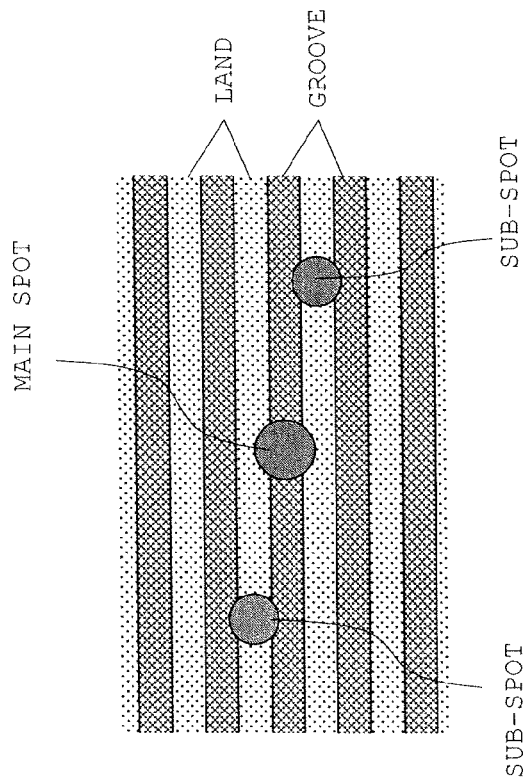
Figure 10A:
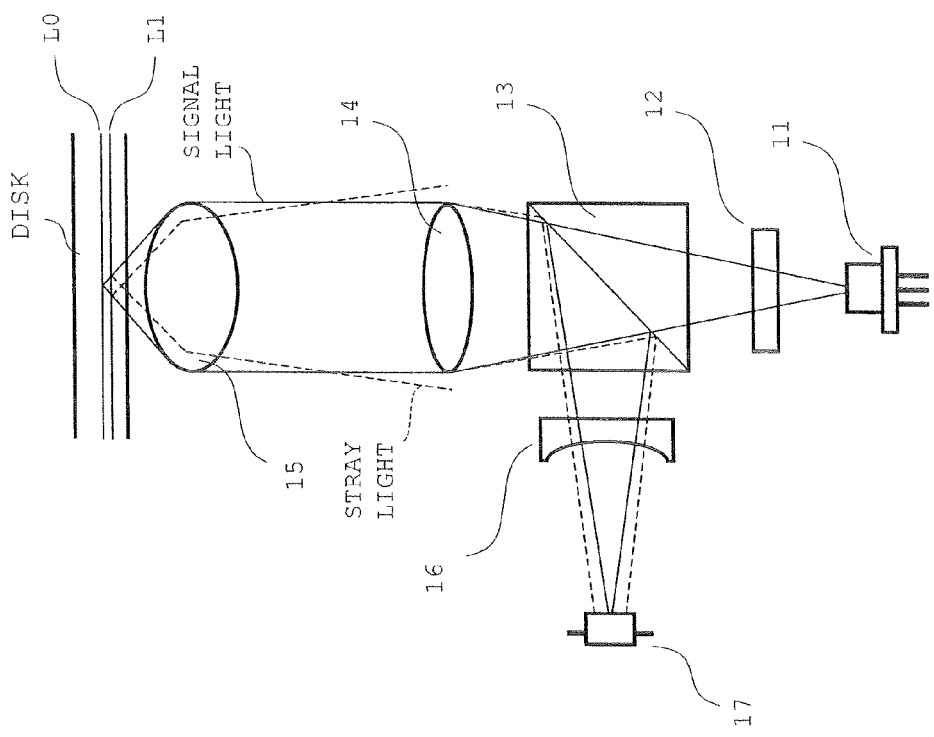
FIGS. 10A and 10B are diagrams illustrating a stray light optical path according to the related art.
Figure 10B:
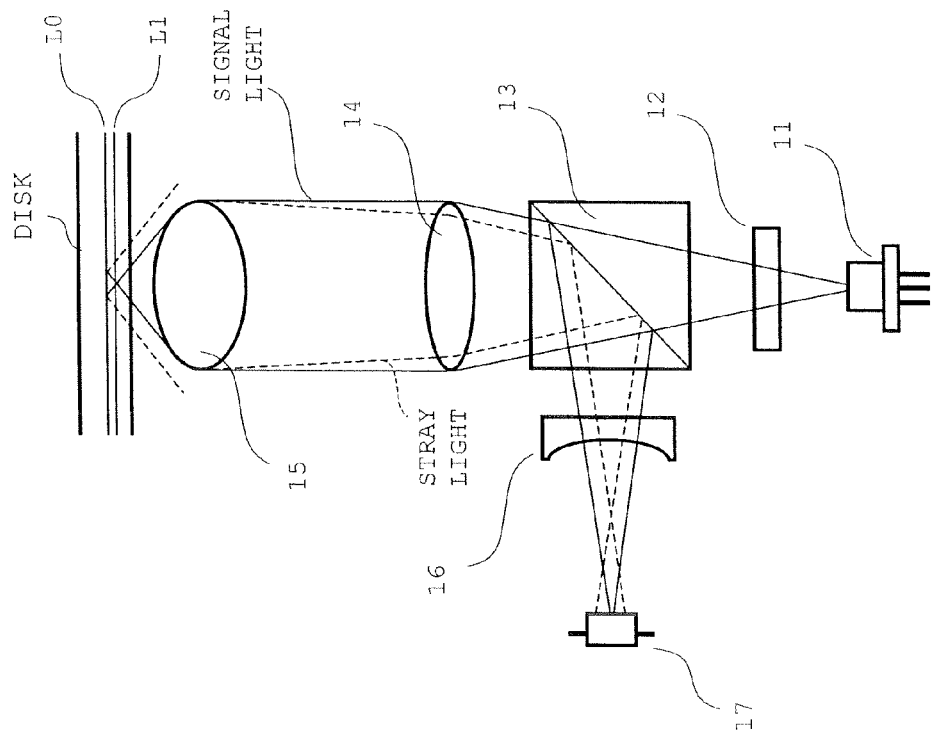
Figure 11:
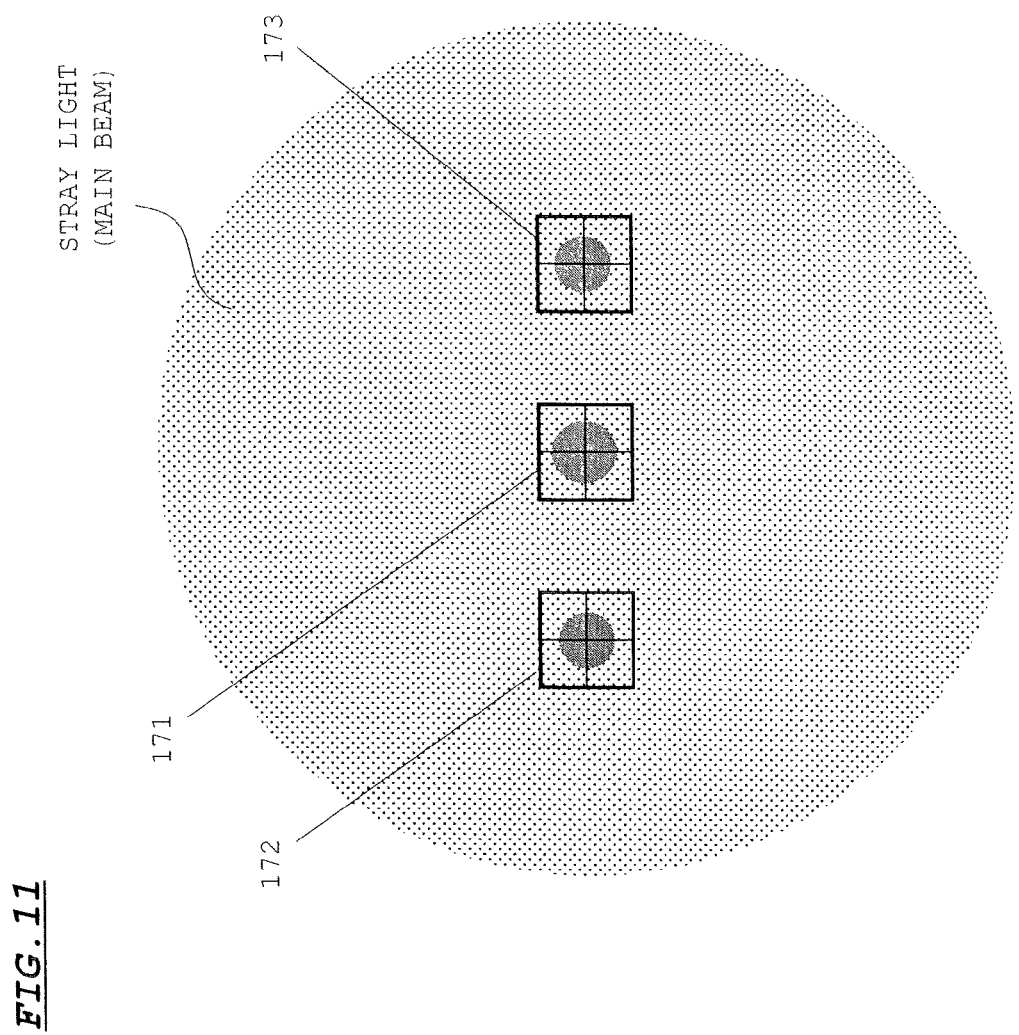
FIG. 11 shows a stray light irradiation state according to the related art.
Figure 12:
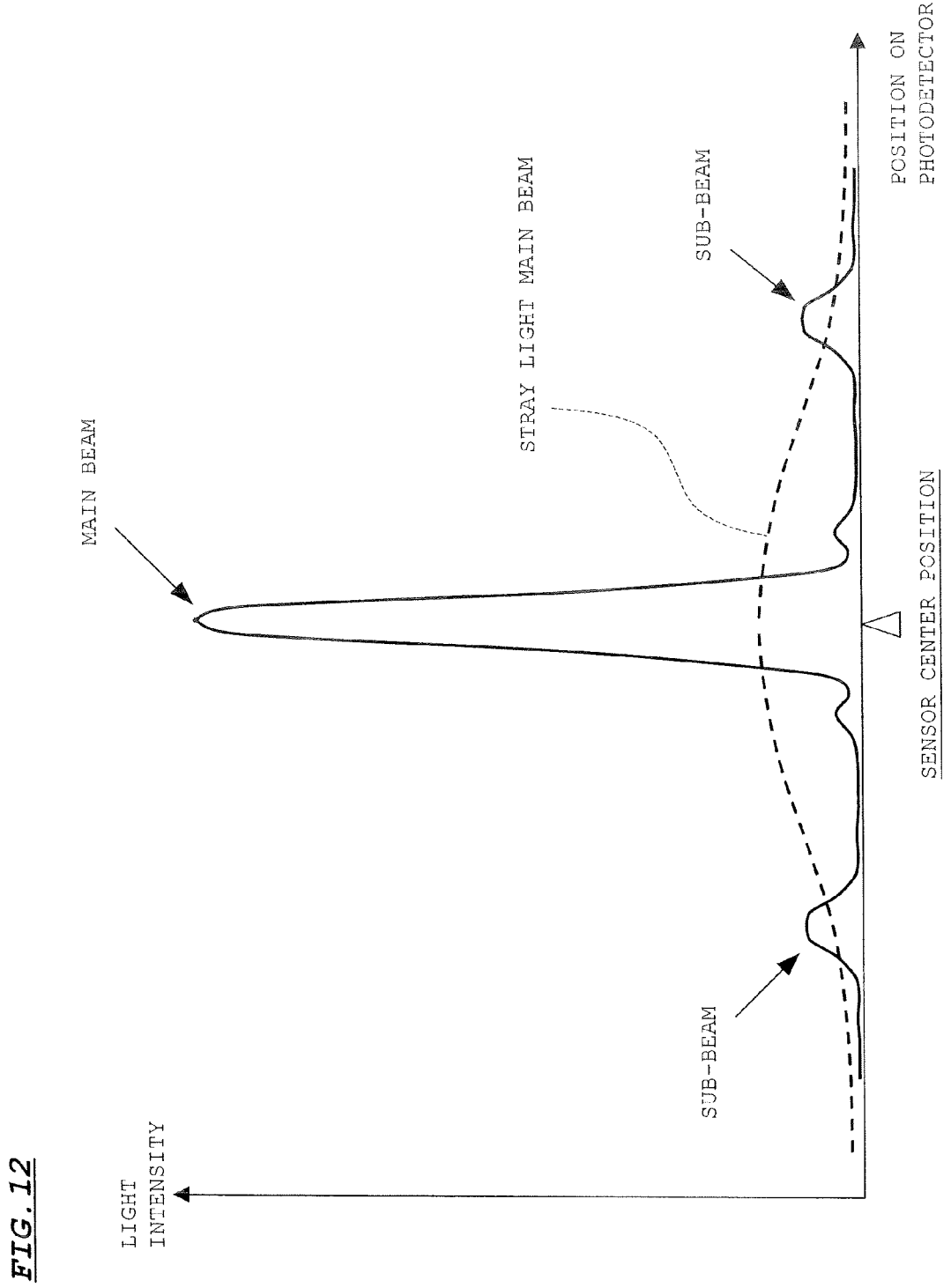
FIG. 12 shows light intensity distribution of signal light and stray light according to the related art.

FIG. 1A shows a configuration of an optical pickup device according to an embodiment of the present invention. In FIG. 1A, the same configurations and components as those of FIG. 7 are designated by the same reference numerals, and the description thereof is omitted.

In the present embodiment, a diffraction element 20 is disposed between a cylindrical lens 16 and a photodetector 17. The diffraction element 20 may be a general surface relief type diffraction grating in which a grating portion 202 is formed by projections and depressions on a surface of a transparent substrate 201 as shown in FIG. 1B. A method of designing the diffraction element 20 will be described later with reference to FIGS. 4A and 4B.

Figure 2A:
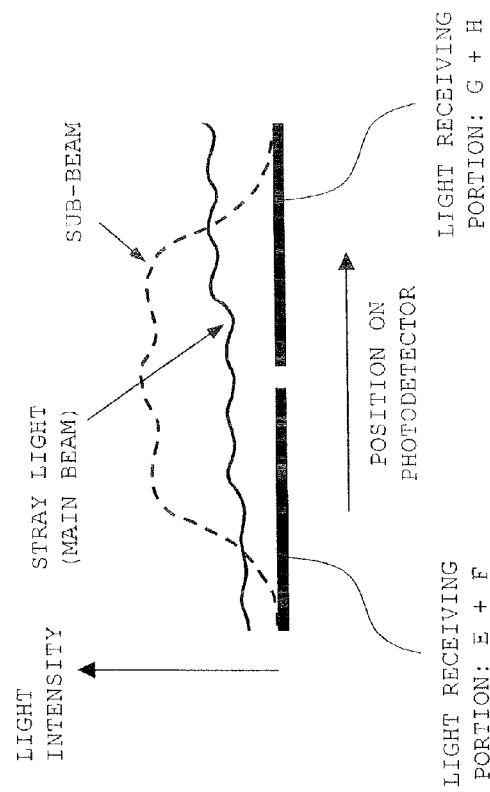
FIG. 2A schematically shows states of a stray light interference fringe and a signal spot on a photodetector when a diffraction element according to the embodiment is disposed, and FIG. 2B schematically shows light intensity distribution on a sensor light receiving surface at that time.
Figure 13:
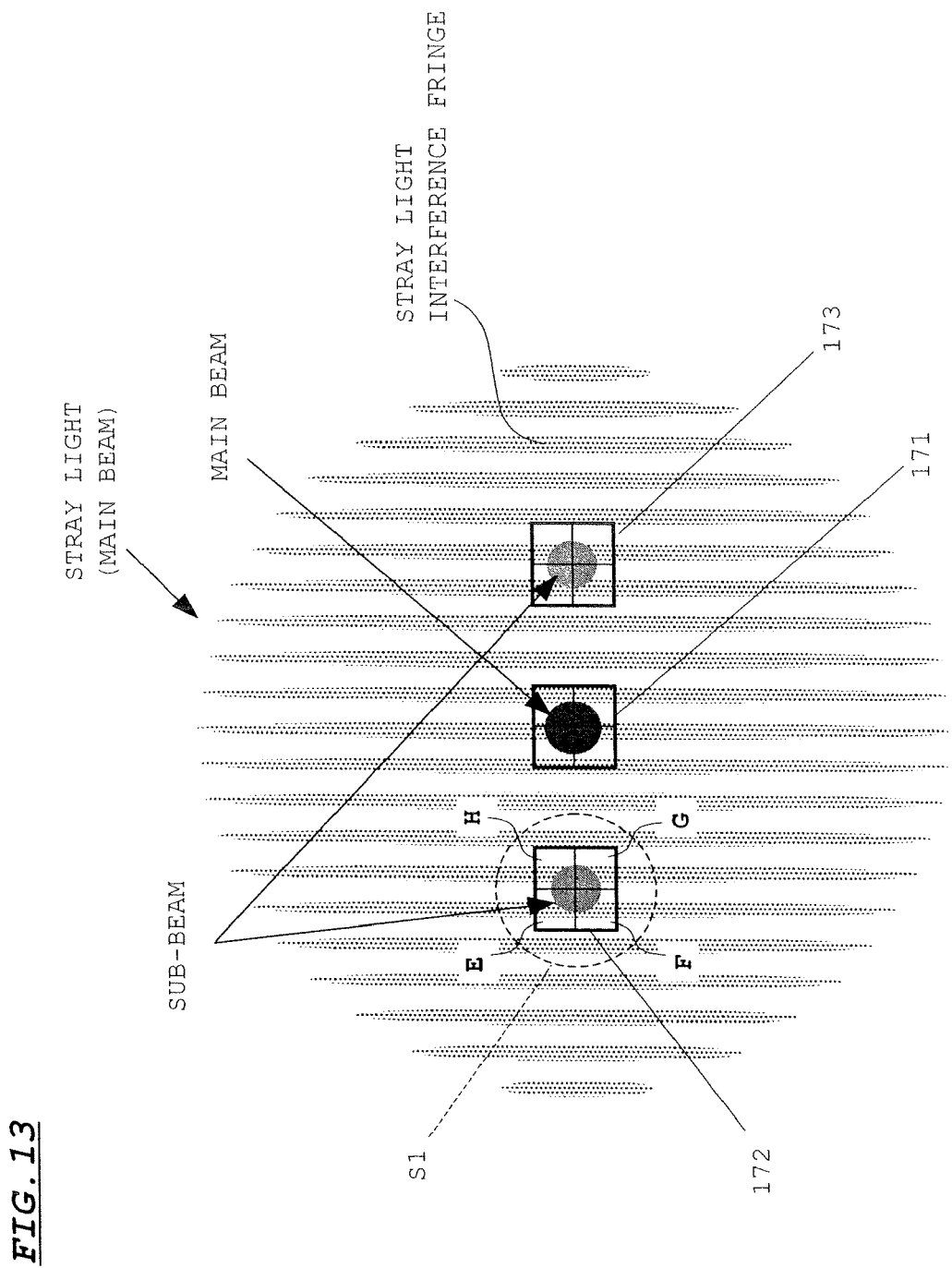
FIG. 13 is diagrams illustrating a problem of the related art.
Figure 14A:
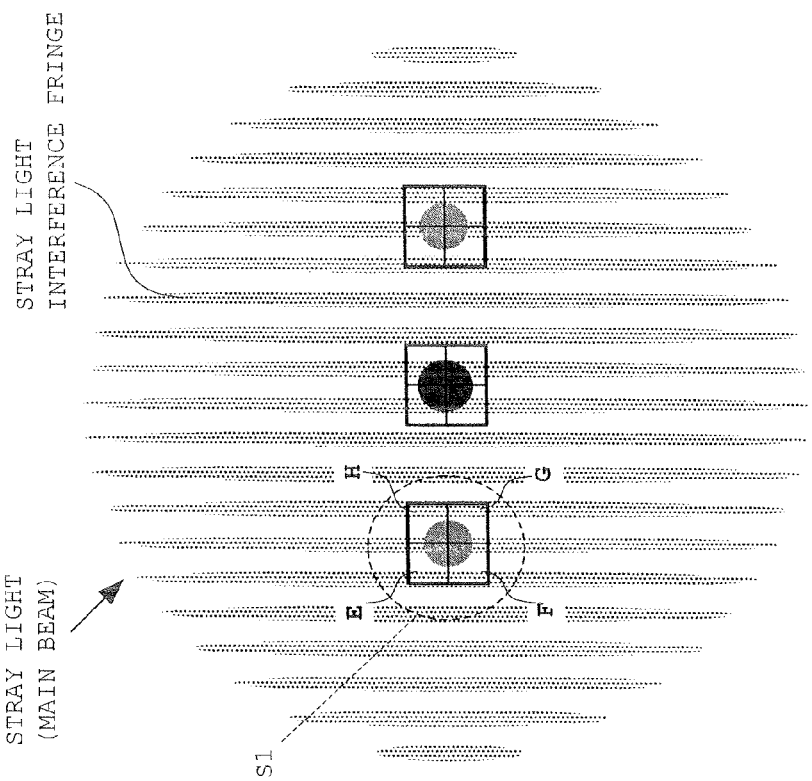
FIGS. 14A and 14B are diagrams illustrating the problem of the related art.
Figure 14B:
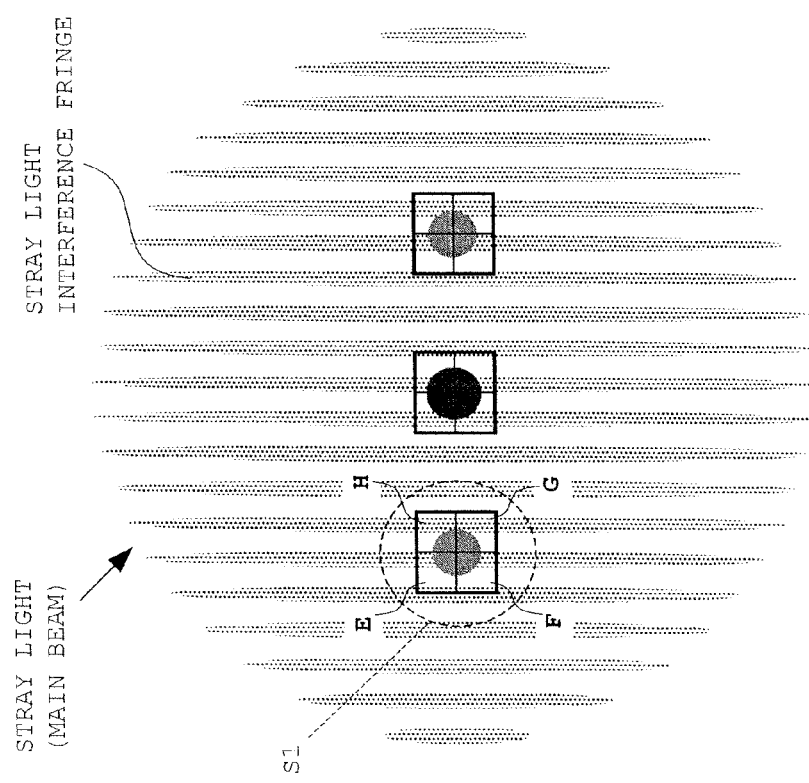
Figure 15C:
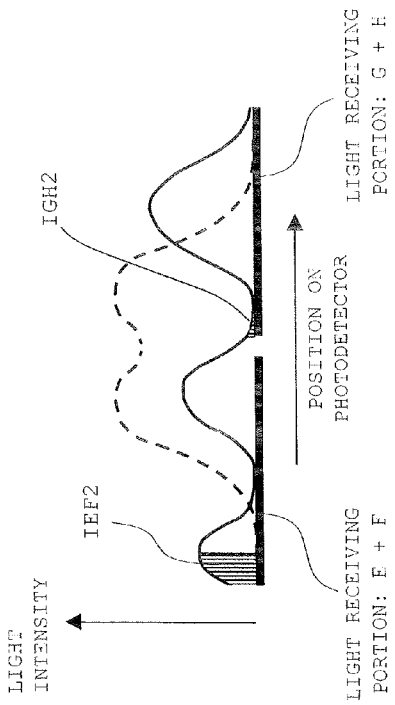
FIGS. 15A, 15B and 15C are diagrams illustrating the problem of the related art.
Figure 15A:
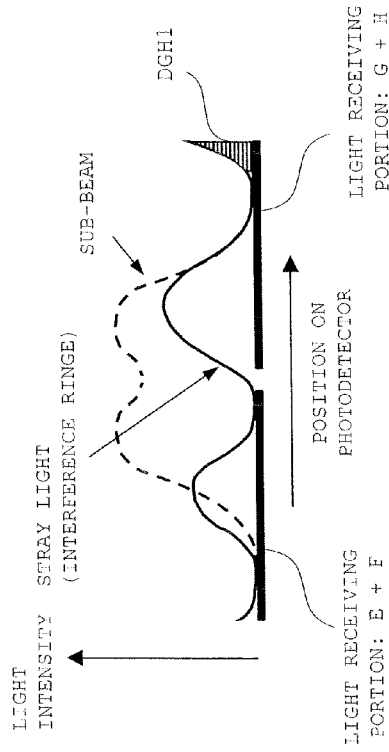
Figure 15B:
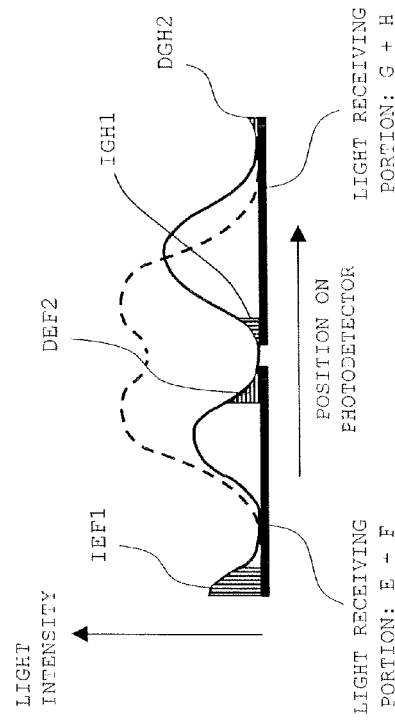
Figure 16B:
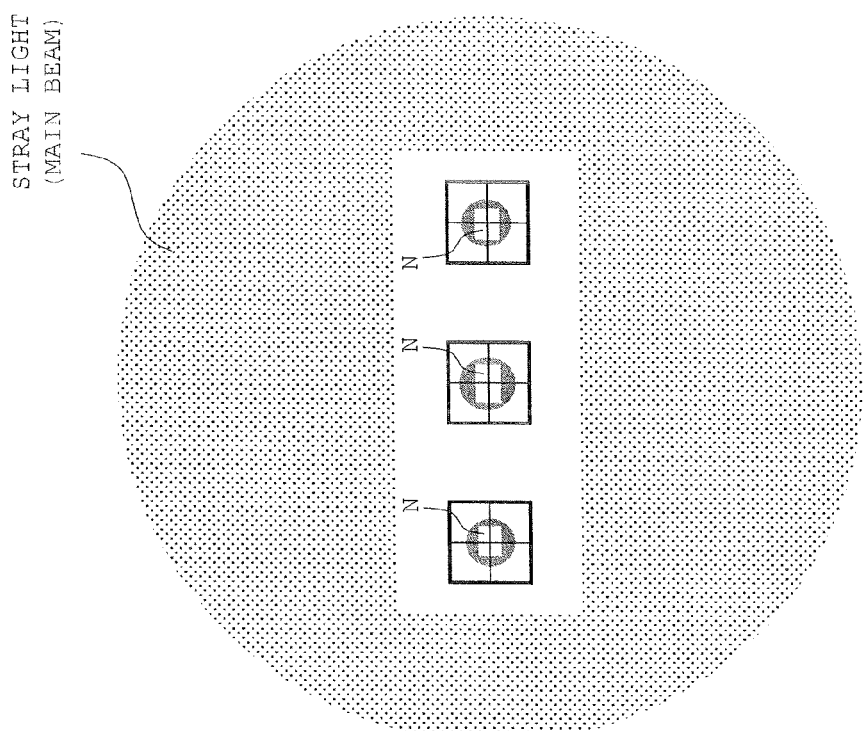
FIGS. 16A and 16B illustrate a technique of suppressing the stray light according to the related art.
Figure 16A:
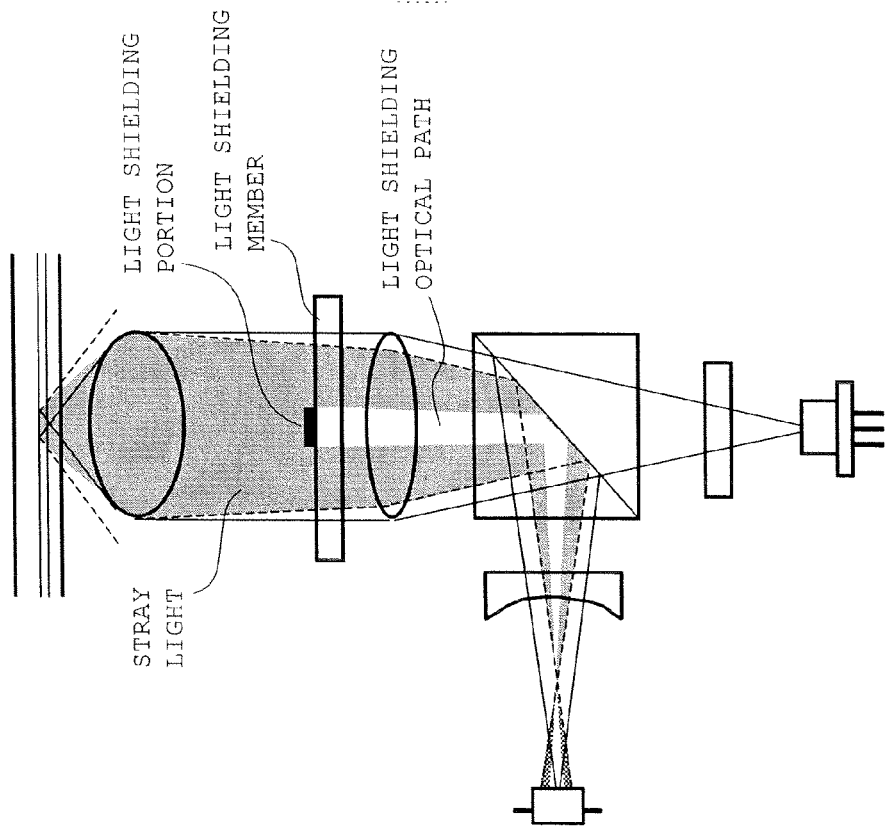
Figure 17B:
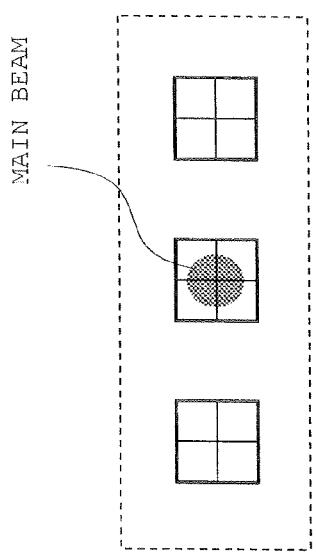
FIGS. 17A and 17B illustrate a technique of suppressing the stray light according to the related art.
Figure 17A:
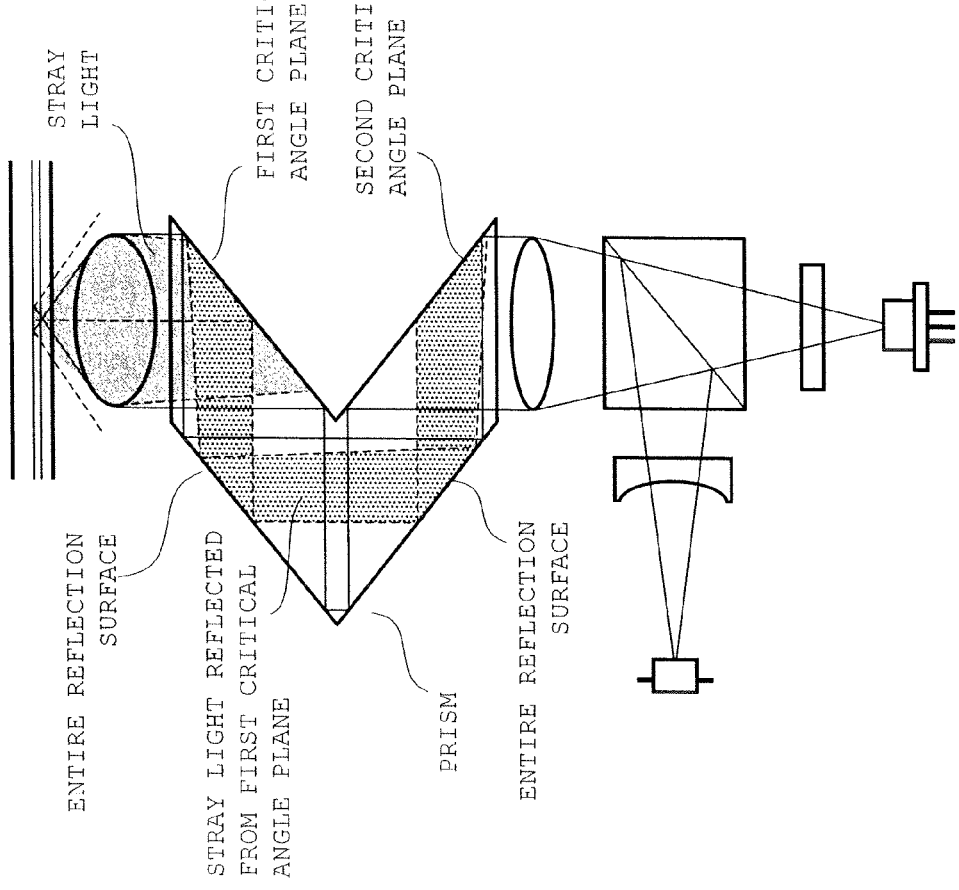

FIG. 2A schematically shows states of the stray light interference fringe and signal spot on the photodetector 17 when the diffraction element 20 is disposed. As shown in FIG. 2A, in the present embodiment, each of the stray light interference fringes shown in FIGS. 13, 14A, and 14B is divided into three lines by the diffraction action of the diffraction element 20, and the fine fringes are formed as a whole. At the same time, the main beam and the sub-beams are also diffracted. Therefore, in the convergent spots of the main beam and sub-beams on the sensor unit, the three spots overlap while being slightly shifted as shown in FIG. 2A.

Figure 2B:
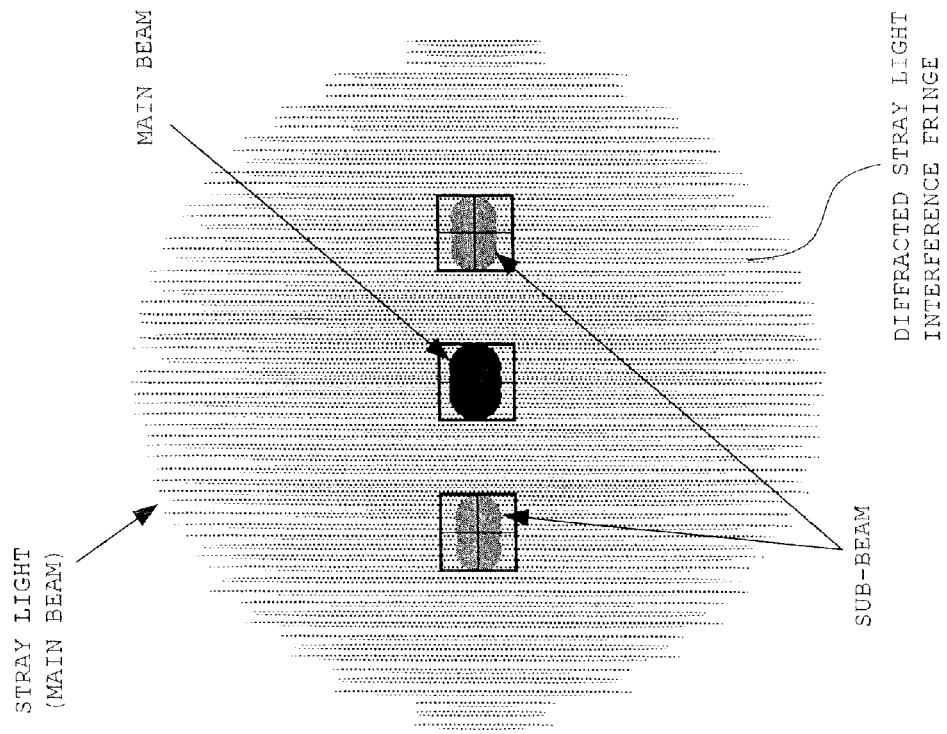

FIG. 2B schematically shows light intensity distribution of a portion corresponding to the region S1 of FIGS. 13, 14A, and 14B. As described above, the stray light interference fringe is segmented by the diffraction action of the diffraction element 20, the stray light intensity distribution on the sensor unit fluctuates with small undulation as shown in FIG. 2B. In the case where the light intensity distribution has small undulation, the output signal from the photodetector 17 is not greatly changed even if the position of the interference fringe is changed with respect to the sensor unit of the photodetector 17. According to the present embodiment, the diffraction element 20 is disposed in front of the photodetector 17 to segment the stray light interference fringe, so that the adverse influence of the stray light interference fringe on the sub-beam signal can be suppressed.

In the present embodiment, because the main beam and sub-beams are diffracted by the diffraction element 20, the convergent spots of the main beam and sub-beams on the sensor unit overlap while being slightly shifted from one another as described with reference to FIG. 2A. However, when the convergent spot is divided into three spots, the focus error signal or the tracking error signal deteriorates as compared with one convergent spot. The deterioration is particularly caused by a signal from the sensor unit which receives a high-intensity main beam. On the other hand, as described in the related art, the stray light has a significant influence on the signal based on the sub-beam while it has little influence on the signal based on the main beam, so that segmentation of the stray light interference fringe may not be performed on the sensor unit for the main beam. Therefore, it is only necessary that the stray light interference fringe be segmented on the sensor unit for the sub-beam, and the main beam is preferably caused to converge as one beam spot without being diffracted on the sensor unit for the main beam.

Figure 3B:
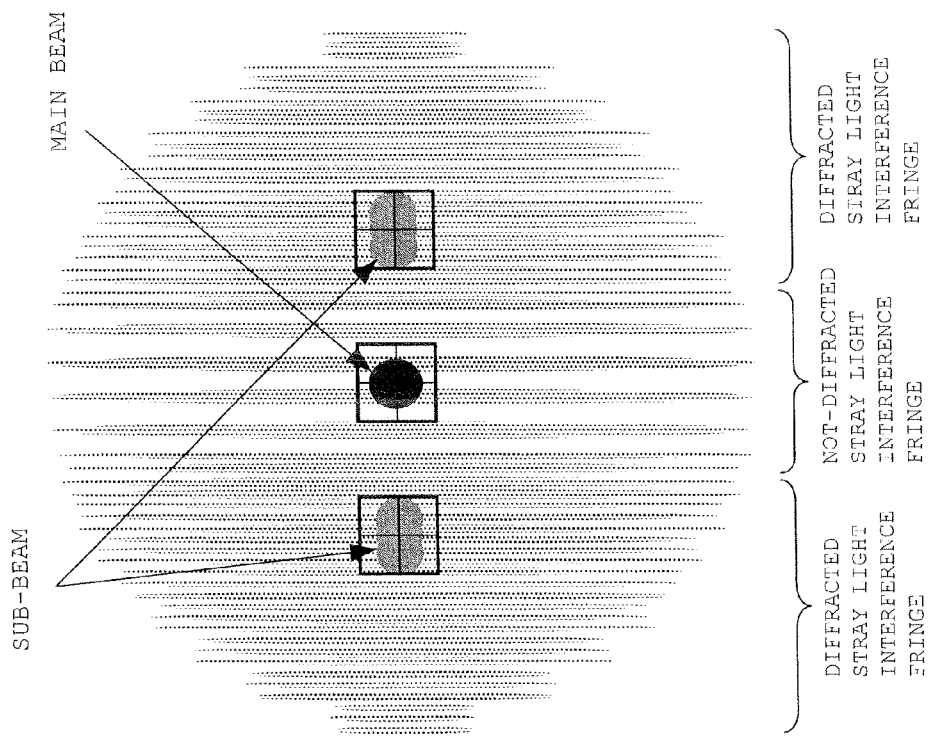
FIG. 3A shows a modification of the diffraction element according to the embodiment, and FIG. 3B schematically shows states of the stray light interference fringe and signal spot on the photodetector when the diffraction element according to the modification is used.
Figure 3A:
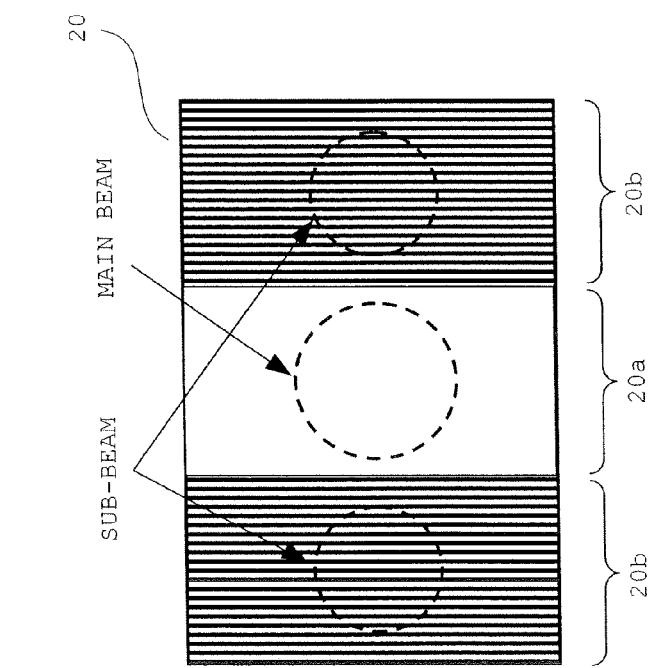

FIG. 3A shows a configuration example of the diffraction element 20 in view of the above. In the configuration of FIG. 3A, the grating portion 202 is not formed in the portion (transparent portion 20a) through which the main beam passes, and the grating portion 202 is formed only in the portion (diffraction region 20b) through which the two sub-beams pass.

FIG. 3B schematically shows states of the stray light interference fringe and signal spot on the photodetector 17 at this time. In this case, only the stray light interference fringe near the sensor unit which receives the sub-beam is segmented, and the stray light interference fringe near the sensor unit which receives the main beam is not segmented. Because the main beam is not diffracted by the diffraction element 20, the main beam spot is not divided into three on the sensor unit.

The method of designing the diffraction element 20 will be described with reference to FIGS. 4A and 4B.

Figure 4A:
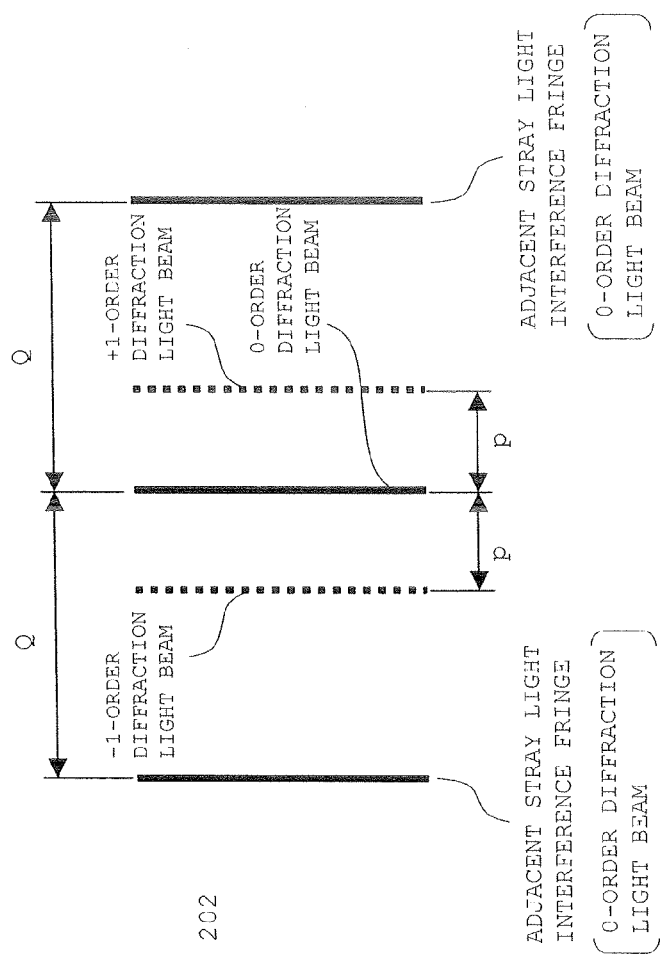
FIGS. 4A and 4B are diagrams illustrating a method of designing the diffraction element according to the embodiment.

Referring to FIG. 4A, assuming that L is a distance between the grating portion 202 and the light receiving surface of the photodetector 17 and p is spacing on the light receiving surface between the 0-order diffraction light beam and the +1-order diffraction light beam or −1-order diffraction light beam, a diffraction angle θ is given by an equation (3):

$$\theta = \tan^{-1}(P/L) \quad (3)$$

At this point, assuming that λ is a light wavelength and the light is perpendicularly incident on the transparent substrate 201, a grating period Λ is given by an equation (4):

$$\Lambda = \lambda/\sin(\theta) \quad (4)$$

Figure 4B:
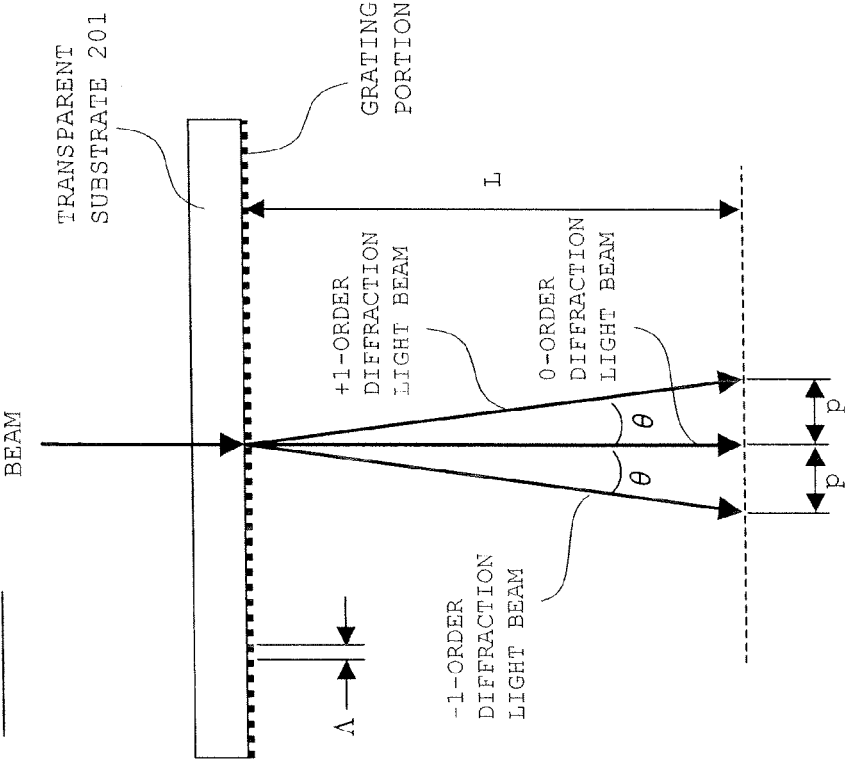

At this point, as shown in FIG. 4B, the spacing p reflects on the spacing of the stray light interference fringes on the light receiving surface of the photodetector 17 (spacing between the stray light interference fringes after being diffracted by the grating portion 202). FIG. 4B schematically shows a diffraction state of the stray light interference fringe on the light receiving surface of the photodetector 17. In FIG. 4B, a solid line expresses the interference fringe generated by the 0-order diffraction light beam, and a dotted line expresses the interference fringes generated by the ±1-order diffraction light beams in the interference fringes generated when the stray light interference fringe is diffracted at the center position expressed by the solid line. In FIG. 4B, the interference fringes of the ±1-order diffraction light beams which are generated when the adjacent stray light interference fringes are diffracted at the positions expressed by the solid lines at both ends are omitted for convenience sake.

In the case where the diffraction element 20 is not disposed, the stray light interference fringes are located at the positions expressed by the solid lines of FIG. 4B (positions of the 0-order diffraction light beam). In this case, Q is the spacing between the stray light interference fringes on the light receiving surface. On the other hand, in the case where the diffraction element 20 is disposed as in the present embodiment, each of the stray light interference fringes is divided into three interference fringes of the 0-order diffraction light beam and ±1-order diffraction light beams, and the interference fringes are generated at the positions expressed by the solid lines of FIG. 4B (positions of the 0-order diffraction light beam) and the positions expressed by the dotted lines (positions of the ±1-order diffraction light beams).

As described below, the relative positions of the interference fringe of the 0-order diffraction light beam and the generation of the interference fringes of the ±1-order diffraction light beams are changed depending on the spacing p of FIGS. 4A and 4B. Therefore, it is necessary to appropriately set the spacing p such that the interference fringe becomes a proper state.

For example, in the case the spacing p between the interference fringe of the 0-order diffraction light beam and the interference fringes of the ±1-order diffraction light beams is equal to the spacing Q of the stray light interference fringe when the diffraction element 20 is not provided, the interference fringes of the ±1-order diffraction light beams overlap the interference fringe of the 0-order diffraction light beam, so that the stray light interference fringe similar to the case in which the diffraction element 20 is not provided is generated on the light receiving surface. In order to avoid such a situation, it is necessary that the spacing p be set such that the interference fringes of the ±1-order diffraction light beams do not overlap with the interference fringe of the 0-order diffraction light beam.

In the case where the spacing p is set to half of the spacing Q, the interference fringes of the ±1-order diffraction light beams based on one stray light interference fringe overlap with the interference fringes of the ±1-order diffraction light beams based on the adjacent stray light interference fringe. Therefore, the case in which the spacing p is set to half of the spacing Q is equivalent to a state where each of the original stray light interference fringes is divided into two. In this case, the segmentation of the stray light interference fringe becomes a lower level compared with the case in which the original stray light interference fringe is divided into three, so that the undulation of the change in intensity of the stray light becomes larger (coarser) than that of FIG. 2B. In order to avoid this situation, the spacing p is preferably set such that the interference fringes of the ±1-order diffraction light beams based on one stray light interference fringe do not overlap with the interference fringes of the 11-order diffraction light beams based on another stray light interference fringe.

In the case where the spacing p is set to ⅓ or ⅔ of the spacing Q, as shown in FIGS. 5A and 5B, the interference fringes of the ±1-order diffraction light beams based on one stray light interference fringe and the interference fringes of the ±1-order diffraction light beams based on the adjacent stray light interference fringe are equally disposed between the interference fringes of the two adjacent 0-order diffraction light beams. Thus, the undulation of the change in intensity of the stray light in FIG. 2B can be lessened by equalizing the spacing of the interference fringes. Therefore, most preferably, the spacing p is set such that the interference fringes of the ±1-order diffraction light beams based on one stray light interference fringe and the interference fringes of the ±1-order diffraction light beams based on the adjacent stray light interference fringe are equally disposed between the interference fringes of the two adjacent 0-order diffraction light beams.

In order to set the spacing p in the above-described manner, it is only necessary that the distance L and the grating cycle Λ be appropriately set based on the equations (3) and (4) such that the spacing p becomes a desired value. In the equation (3), the distance L is preferably set to one in which the main beam and the sub-beams are spatially separated on the grating portion 202. This enables the main beam and the sub-beams to be incident on the transparent portion 20a and diffraction region 20b of the diffraction element 20 respectively, as shown in FIG. 3A.

As described above with reference to FIG. 2A, in the convergent spots of the main beam and the sub-beams on the sensor units, the three spots overlap while being slightly shifted by the diffraction action of the grating portion 202. The shift amount between the spots is increased as the spacing p is widened. Therefore, the excessively widened spacing p may significantly influence the focus error signal and the tracking error signal. Therefore, the spacing p is preferably set to an extent where the spacing p does not exceed the spacing Q between the stray light interference fringes where the diffraction element 20 is not provided. That is, the spacing p is preferably set such that the spacing p is smaller than the spacing Q.

In FIGS. 5A and 5B, the spacing p is set to ⅓ or ⅔ of the spacing Q. Similarly, in the case where the spacing p is set to ⁴⁄₃ or ⁵⁄₃ of the spacing Q, the spacing of the interference fringes is equalized. However, in this case, the shift amount between the spots on the sensor unit becomes larger as compared with the case of FIGS. 5A and 5B, and the focus error signal and tracking error signal may deteriorate more easily. Therefore, as shown in FIGS. 5A and 5B, the spacing p is set to ⅓ or ⅔ of the spacing Q, and more preferably, the spacing p is set to ⅓ of the spacing Q.

The same holds true for the case in which the spacing p is set to another value. For example, the case in which the spacing p is set to ¼ of the spacing Q is identical to the case in which the spacing p is set to ⁵⁄₄ of the spacing Q in the way the interference fringe is generated on the sensor unit, although the shift amount becomes larger in the latter. Therefore, in this case, the spacing p is properly set to ¼ of the spacing Q.

A specific design example of the diffraction element 20 will be described below. The design example is applied to an optical pickup device in which the spacing Q between the stray light interference fringes is measured to be about 39 μm on the photodetector 17. The spacing p of the interference fringe is set to 13 μm so as to be equalized after the diffraction, and the distance L between the grating portion 202 and the light receiving surface of the photodetector 17 is set to 1 mm. Assuming that the semiconductor laser 11 has the output wavelength λ of 405 nm, the grating cycle Λ becomes 31.2 μm from the equations (3) and (4). In the case where the transparent substrate 201 of the diffraction element 20 is made from optical glass (BK7), a diffraction ratio becomes +1-order:0-order:−1-order=1:1:1 at a grating depth of 244 nm and a duty ratio (ratio of a projection width to a grating period) of 0.5.

According to the design example, the spacing of between the interference fringes is equalized on the sensor unit, so that the undulation of the change in intensity of the stray light can be suppressed most effectively. Additionally, because the spacing p is suppressed to about ⅓ of the spacing Q, the shift amount between the spots can be suppressed on the sensor unit, and thereby the deterioration of the focus error signal and tracking error signal can be suppressed.

When the present inventor performed a simulation for the deterioration of the focus error signal and tracking error signal caused by the shift between the spots under the conditions of the design example, it was confirmed that the decreases in amplitudes of the focal error signal (S curve) and tracking error signal were suppressed to about 10% as compared with the case in which the diffraction element according to the design example was not disposed. The simulation was performed based on the assumption that the diffraction element (see FIG. 3A) did not impart the diffraction action to the main beam. Therefore, in the case of using the diffraction element according to the design example, not only the deterioration of the tracking error signal caused by the stray light interference fringe can effectively be suppressed, but also the amplitude deterioration of the focal error signal and tracking error signal caused by the shift between the spots can be suppressed.

In the conditions of the design example, the signal deterioration caused by the fluctuation in stray light interference fringe can be suppressed most effectively under the conditions that the spacing p is set to Q/3 and the diffraction ratio is set to +1-order:0-order:−1-order=1:1:1. For further suppressing the amplitude deterioration of the focus error signal and tracking error signal, it is only necessary that the spacing p be narrowed smaller than the spacing of Q/3 to decrease the shift amount between the spots, or that the grating depth and the duty ratio be adjusted to further decrease the diffraction ratio of ±1-order.

Although the embodiment according to the present invention is described above, the present invention is not limited to the above-described embodiment. Various modifications and changes can be made in the embodiment according to the present invention.

Figure 6:
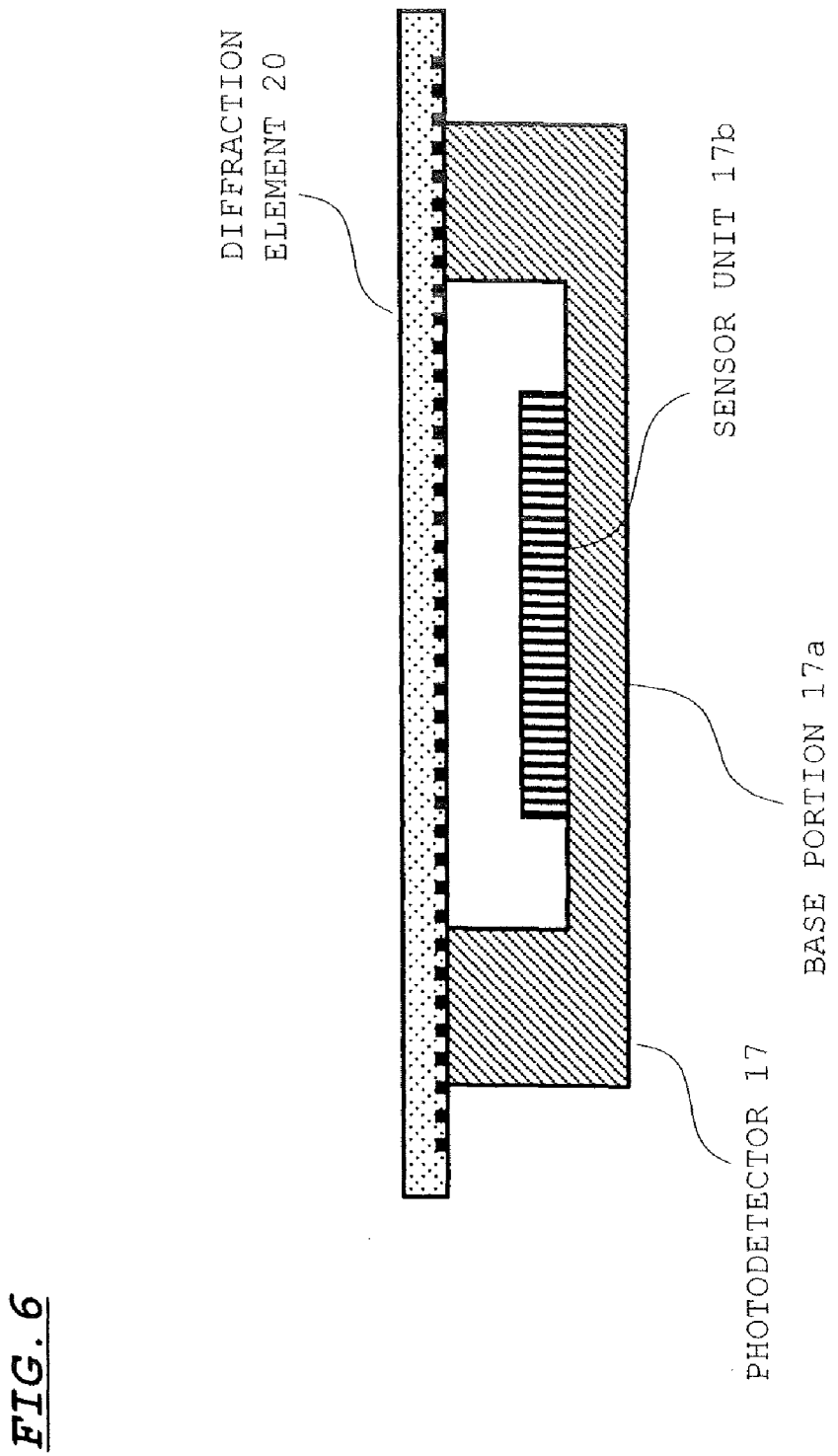
FIG. 6 shows a configuration example when the diffraction element according to the embodiment is integrated with a photodetector.

Although the photodetector 17 and the diffraction element 20 are separately provided in the above embodiment, the photodetector 17 and the diffraction element 20 may be integrated as shown in FIG. 6. In the configuration of FIG. 6, a recess is made in the base portion 17a of the photodetector 17, and the sensor unit 17b including the three quadrant sensors 171, 172, and 173 (see FIGS. 9A and 9B) is disposed in the recess. The diffraction element 20 is bonded to the upper surface of the base portion 17a so as to close the recess. At this point, the depth of the recess is set such that the distance L between the grating portion 202 of the diffraction element 20 and the light receiving surface of the sensor unit 17b becomes a predetermined distance (for example, 1 mm). According to the configuration of FIG. 6, because there is no need to adjust the distance between the diffraction element 20 and the photodetector 17, workability can be improved in assembling the optical system. Because the distance between the grating portion 202 of the diffraction element 20 and the light receiving surface of the sensor unit 17b is fixed to a proper value, the above-described effect of the present embodiment can properly be exerted. Additionally, the structure is simplified because the diffraction element 20 also acts as a cover glass for closing the recess.

In the design example, the laser wavelength is set to 405 nm to design the diffraction element with next-generation DVDs in mind. However, the present invention can appropriately be applied to existing DVDs and CDs and the like in addition to next-generation DVDs.

Moreover, the optical system of the optical pickup device is not limited to that of FIG. 1A. For example, the present invention can be applied to an optical system in which the beam splitter 13 is altered to a polarization beam splitter and a quarter-wave plate is added between the collimator lens 14 and the objective lens 15.

It is necessary that the diffraction element 20 be disposed at the position where the diffraction element 20 properly exerts the diffraction action on the stray light. For example, when the diffraction element 20 is disposed near a focal position of the stray light, the diffraction element 20 hardly exerts proper diffraction action on the stray light. The diffraction element 20 is preferably disposed proximate to the photodetector 17 such that sufficiently spread stray light is incident on the diffraction element 20.

In the above embodiment, the beam splitter 13 is used as the beam branching element. Alternatively, other beam branching elements, e.g. a hologram element, may be used.

In the above embodiment, the diffraction element 20 is provided as the surface relief type diffraction grating. Alternatively, other types of the diffraction gratings may be used as the diffraction element 20.

It should be understood that various changes and modifications of the present invention can appropriately be made without departing from the scope of the technical idea defined in the appended claims.

What is claimed is:

1. An optical pickup device for irradiating an optical disk having a plurality of recording layers in a laminated direction with a laser beam, the optical pickup device comprising:
    a light source which emits the laser beam;
    a diffraction grating which divides the laser beam into a main beam and two sub-beams;
    an objective lens which causes the main beam and the two sub-beams to converge on a target recording layer among the plurality of recording layers;
    a photodetector including three light receiving units for separately receiving the main beam and the two sub-beams reflected from the target recording layer;
    a beam branching element which separates the laser beam traveling from the light source toward the objective lens and the reflected light toward the photodetector; and
    a diffraction element disposed between the beam branching element and the photodetector to further segment an interference fringe of light reflected from a recording layer except the target recording layer on the light receiving unit, the interference fringe being generated by optical action in the diffraction grating.

2. The optical pickup device according to claim 1, wherein the diffraction element is configured such that spacing p on the light receiving unit between a 0-order diffraction line and ±1-order diffraction lines of the interference fringe, diffracted by the diffraction element, is smaller than spacing Q between the interference fringes generated on the light receiving unit when the diffraction element is not disposed.

3. The optical pickup device according to claim 1, wherein the diffraction element is configured such that ±1-order diffraction lines of the interference fringes diffracted by the diffraction element do not overlap with each other on the light receiving unit.

4. The optical pickup device according to claim 1, wherein the diffraction element is configured such that 0-order diffraction lines and ±1-order diffraction lines of the interference fringes, diffracted by the diffraction element, are arranged on the light receiving unit in same spacing.

5. The optical pickup device according to claim 4, wherein the diffraction element is configured such that the spacing p on the light receiving unit between a 0-order diffraction line and ±1-order diffraction lines of the interference fringe, diffracted by the diffraction element, becomes one-thirds of the spacing Q of the interference fringes generated on the light receiving unit when the diffraction element is not disposed.

6. The optical pickup device according to claim 1, wherein the diffraction element is integrated with the photodetector.

7. The optical pickup device according to claim 6, wherein a recess is formed in a base portion of the photodetector, a sensor unit is disposed in the recess, and the diffraction element is fixedly bonded to an upper surface of the base portion such that the diffraction element closes the recess.

8. The optical pickup device according to claim 1, wherein the diffraction element is disposed at a position where the main beam and the sub-beams are spatially separated.

9. The optical pickup device according to claim 8, wherein a structure for exerting diffraction action is not provided in a region through which the main beam passes, but the structure for exerting the diffraction action is provided in a region through which the two sub-beams pass.

* * * * *